United States Patent [19]

Cohl

[11] Patent Number: 4,574,620

[45] Date of Patent: Mar. 11, 1986

[54] FIXTURING AND PROCESS FOR PRESSURIZING ENGINE CYLINDERS

[76] Inventor: Arnold Cohl, 28770 Brooks La., Southfield, Mich. 48034

[21] Appl. No.: 656,589

[22] Filed: Oct. 1, 1984

[51] Int. Cl.[4] ............................................. G01M 3/26
[52] U.S. Cl. .......................................... 73/47; 73/49.7
[58] Field of Search ............. 73/47, 119 R, 115, 49.7, 73/46, 40

[56] References Cited

U.S. PATENT DOCUMENTS

| 2,003,949 | 6/1935 | Morgan et al. | 73/47 X |
| 2,625,033 | 1/1953 | Adair | 73/47 |
| 3,320,801 | 5/1967 | Rhindress, Jr. | 73/47 X |

FOREIGN PATENT DOCUMENTS 841705 7/1960 United Kingdom ................... 73/47

*Primary Examiner*—Stewart J. Levy

*Assistant Examiner*—Joseph W. Roskos
*Attorney, Agent, or Firm*—John R. Benefiel

[57] ABSTRACT

Fixturing and processes for automotive diagnostic and repair procedures are disclosed involving simultaneous pressurizing of the cylinders of a piston internal combustion engine for servicing the engine. The fixturing includes a manifold body having passages and a number of outlet ports pressurized by connection to a source of air pressure, each port being fitted with a pressure coupling for connection to one end of a pressure hose. Each pressure coupling includes a check valve which closes the associated outlet port if a pressure hose is not coupled thereto so that fewer hoses than the total number of outlet ports may be pressurized. Checks for leaking valves and piston rings are conducted by removal of one hose at a time after pressurization of all of the cylinders, while checks for head gasket leaks and valve servicing are conducted while a number of cylinders are simultaneously pressurized.

12 Claims, 3 Drawing Figures

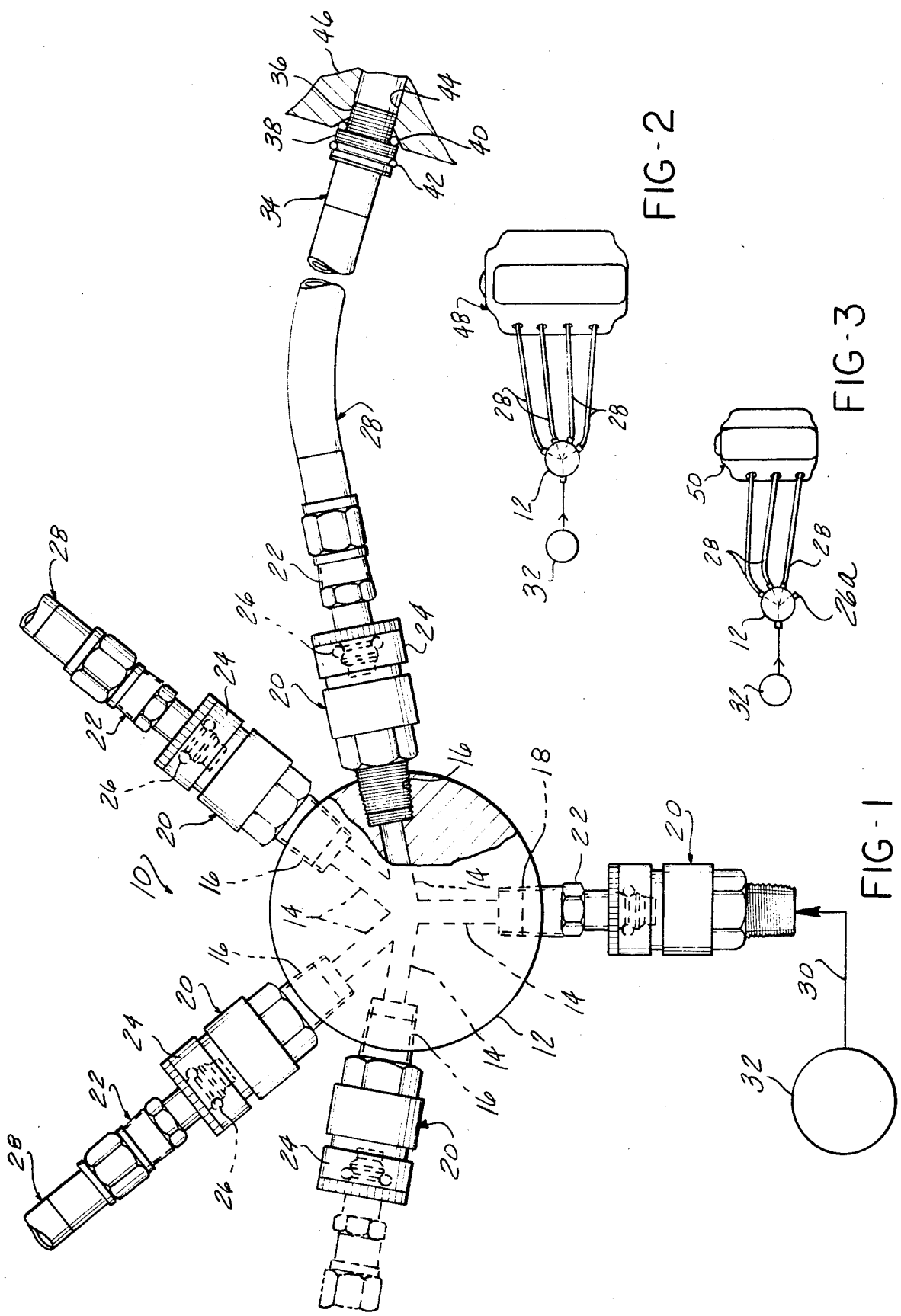

FIXTURING AND PROCESS FOR PRESSURIZING ENGINE CYLINDERS

BACKGROUND DISCUSSION

This invention relates to mechanical servicing of internal combustion engines and more particularly to fixturing and process for pressurizing the cylinders of an internal combustion piston engine so as to enable repair and adjustment of the overhead valve components, and to conduct certain diagnostic procedures on the valving, piston rings and head gaskets.

It has heretofore been known to apply compressed air within each of the cylinders of an internal combustion engine. This pressurization causes the engine valves to be forced onto their seats. This in turn allows the replacement of the valve springs, tappets and other valving components.

In this prior art practice, a special fitting has been employed connected to the end of an air hose which allows the air hose to be connected to a spark plug opening. This procedure was followed for each cylinder with connection and disconnection of the air hose.

An alternative approach is disclosed in U.S. Pat. No. 4,292,141 in which a bladder is inserted into the spark plug opening with a compressible bulb being connected thereto with a hose for manual inflation of the bladder. Similarly, the arrangement disclosed in that patent contemplates a cylinder-by-cylinder pressurization.

A cylinder-by-cylinder procedure is relatively inefficient as it requires connection and disconnection of the air hose each time a single set of valves is worked on.

Furthermore, the application of high pressure compressed air within the engine cylinder may cause the engine to be inadvertently rotated by the pressure on the piston, if a given piston is in a raised position. This is a greater possibility if all of the spark plugs have been removed from the engine and presents a possible hazard which desirably should be avoided.

Also, it would be highly desirable for any tooling utilized in this procedure to be adaptable to various types and models of engines, i.e., V-8, V-6 and straight four, and engines using different spark plug sizes.

It is also desirable that mechanics' tools be relatively simple and expeditiously usable, such as to improve the efficiency of the mechanic utilizing the equipment.

It is often necessary to perform leakage tests on the valves, piston rings and head gasket. This is normally done by inserting a compression tester successively in each spark plug opening and cranking the engine until the top dead center position is reached for the particular piston. Thus, this also requires a cylinder-by-cylinder procedure, and cranking of the engine to reach top dead center for each individual cylinder.

Accordingly, it is an object of the present invention to provide fixturing and a process for simultaneously pressurizing a plurality of the engine cylinders of the piston type internal combustion engine so as to enable work to be performed on several cylinders without interruption.

It is a further object of the present invention to provide such fixturing which may be adapted to either four, six or eight cylinder engines.

It is another object of the present invention to enable the appropriate cylinders to be simultaneously pressurized by the fixturing to produce a pressure balanced condition and without necessitating different fixturing for each engine type and model.

It is another object of the present invention to provide an improved fixturing and process for detection of engine, valve, cylinder head gasket, and piston ring leaks enabling more rapid and expeditious testing.

It is yet another object of the present invention to provide such fixturing which is simple to use and of rugged construction and able to be manufactured at a low cost.

SUMMARY OF THE INVENTION

These and other objects of the present invention, which will become apparent upon a reading of the following specification and claims, are achieved by fixturing including a generally cylindrical manifold body having an angularly arrayed series of air outlet ports and a single air inlet port, all in internal communication with each other. Preferably, there are four outlet ports in the series, each outlet port having associated with it a pressure coupling assembly of known construction which is widely employed as a quick disconnect for use with pneumatic equipment. Each of these assemblies allows ready coupling of a respective air hose assembly by axial movement of a coupling sleeve and insertion of a coupling fitting on the air hose.

If an air hose is not coupled to a given pressure coupling assembly, an internal check valve closes the respective outlet port, such that any number of air hoses from one to four may be connected to associated engine cylinders while preventing escape of the pressurized air from the unconnected outlet port. Thus, from one to four engine cylinders may be simultaneously pressurized.

The end of each of the series of air hoses is formed with threaded, stepped diameters, each of a different thread size to enable connection of the air hose end to spark plug openings of differing standard sizes, to be able to be used with engines having spark plugs of either 14 mm or 18 mm size.

This configuration allows simultaneous pressurizing of the combustion chambers of each cylinder in a bank of cylinders of either V-6 or V-8 engines, or all of the cylinders of four cylinder engines, making possible efficient work on the engine valve components and to insure a balance of the air pressure acting on the pistons.

In addition, the simultaneous pressurizing of the combustion chamber of the engine cylinders allows an efficient rapid detection of a leakage condition in the valves, head gaskets or piston rings, and the identification of the faulty component.

DESCRIPTION OF THE DRAWINGS

FIG. 1 is a plan view of the fixturing according to the present invention showing a series of three air hoses connected thereto with a fourth outlet port disconnected, with a schematic representation of a source of air pressure and showing one of the air hoses connected within the spark plug opening of an engine cylinder.

FIG. 2 is a diagrammatic representation of the connection of the fixturing to the cylinders of one of the banks of a V-8 engine.

FIG. 3 is a diagrammatic representation of the connection of the cylinders of one bank of a V-6 engine.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIG. 1, the fixturing 10 according to the present invention includes a manifold body 12 which is of generally cylindrical shape, and of a size on the order of three inches in diameter and one inch in depth so as to accommodate a radial array of internal passages 14, each converging to a central location to be in communication with each other. Each passage 14 extends outwardly to a respective one of a series of ports machined into the periphery of the manifold body 12. Four of these ports comprise outlet ports 16, with the remainder an inlet port 18, as seen in FIG. 1.

Each of the outlet ports 16 is concentrated on one half of the periphery of the manifold body 12 with the inlet port 18 disposed centrally of the other half of the manifold body 12.

This disposes each of the outlet ports 16 in an angularly fanned array, for easy connection of one of each of a series of engine cylinder spark plug openings, as will be described.

The outlet ports 16 threadably receive a male component of a quick connect coupler-check valve assembly 20 commonly used with air hoses, which incorporates an internal check valve. Such pressure coupler-check valve assemblies are well known and commercially available and are adapted for quick connection by coupling to a respective male fitting 22. This is achieved simply by retraction of the spring loaded sleeve 24 and insertion of the end of the male coupling fitting 22 thereinto and release of the spring loaded sleeve 24, which causes locking balls 26 to be received within a groove on the end of the male component 22. At the same time, the insertion of the male coupling component 22 interacts with an internal check valve (not detailed in FIG. 1) in a known manner, to establish fluid communication between the port and the internal passages 14. This thus allows pressurizing of an air hose assembly 28 affixed to the male component 22.

Pressurizing the internal passages 14 is achieved by the use of a pressure coupler male component 22, threadably received within the inlet port 18 for ready connection to a pressurized air hose in turn equipped with a female coupler 20, connected to a source of air pressure, indicated diagrammatically at 32. This arrangement allows connection and disconnection of from one to four outlet air pressure hose assemblies 28 to in turn enable pressurization of from one to four engine cylinders simultaneously.

A connection to the engine cylinders is achieved by an end fitting 34 attached to each of the series of air hoses 28. End fitting 34 is provided with stepped diameter portions 36 and 38, each of which carry standard (14 mm and 18 mm) spark plug diameters and thread sizes.

O-ring seals 40 and 42 are provided to the rear of each of the threaded stepped diameters 36 and 38 and this enables sealing by hand-threading of the appropriate threaded diameter 36 and 38 within a spark plug opening 44 of the engine cylinder 46.

Accordingly, each of the hose assemblies 28 may be mounted onto a respective spark plug opening along one bank of the internal combustion piston engine 48 as shown in FIG. 2. Each hose assembly is also connected to the manifold body 12 by coupling of the male fitting 22 and the coupling assembly 20. This thus allows simultaneous pressurization of all of the cylinders of one bank to the engine 48.

As shown in FIG. 3, fewer than four air hose assemblies may be employed for pressurizing the cylinder bank of a smaller engine, i.e., the three cylinders of one bank of a V-6 engine, indicated diagrammatically at 50 in FIG. 3.

If a hose assembly 28 is not connected to an outlet port 16 of the manifold body member 12, the unconnected port 16a is sealed from communication with the internal passages 14 by the action of the check valve incorporated in the coupling check valve assembly 20.

Thus, after removal of the rocker arms and pressurization, the valves in each cylinder may be held closed for removal and replacement of the springs, seals, keepers and adjustment. This can be done on a number of cylinders at once without danger of engine movement.

In another process, air hose assemblies 28 may be connected to cylinders on opposite banks to diagnose head gasket failure. In a water cooled engine, this may be done by removal of the radiator cap and observing any escaping bubbles in the coolant. By successive removal of the air hoses 28, a defective cylinder head gasket may be detected by noting the continued presence or absence of bubbles upon disconnection of the air hose associated with the respective bank.

If no bubbles are detected but a steady air flow detected after disconnection of one or more hoses, a blown gasket between cylinders is indicated.

To check for leaking intake valves, all cylinders in one bank are pressurized and a hand is placed over the carburetor. If any air is felt escaping from the carburetor, a leaking valve is indicated. By disconnecting each hose, one at a time, the stopping of air flow at the carburetor will identify the cylinder in which the valve is leaking.

The same procedure can be followed to detect leaking exhaust valves by checking for air flow at the tail pipe.

Worn compression piston rings can also be indicated by detecting excessive flow through the hoses into the combustion chamber past the rings into the crankcase. This can be done again by disconnecting the hoses one at a time and listening for an increase in pressure due to reduced air flow resulting from disconnection of a particular hose.

The enablement of pressurizing a number of engine cylinders provides a pressure balanced condition of the cylinders while allowing efficient service operations as in the replacement of engine valve springs, tappets and other components. At the same time, the fixturing is relatively simple and easily used utilizing primarily standard components to be able to be manufactured at relatively low cost. The stepped diameter hose assembly and fittings 34 further enhances the adaptability of the fixturing to various engines such as to be usable by the automotive mechanic servicing a very wide variety of engine models.

I claim:

1. Fixturing for servicing internal combustion engines of the type having a plurality of engine cylinders, each provided with a threaded spark plug opening, said fixturing enabling simultaneous pressurizing of a plurality of engine cylinders for performing servicing of said engine, comprising:

a manifold body formed with a series of outlet ports and an inlet port, and also formed with a series of internal passages in communication with each of said inlet and outlet ports and with each other;

a series of quick disconnect pressure coupling-check valve assemblies received within each of said outlet ports, each assembly enabling connection of pressure hoses to a respective outlet port to establish fluid communication therewith, while closing off fluid communication of the associated outlet port with said internal passages upon removal of said pressure hose;

a corresponding series of pressure hoses each having a coupling fitting at one end matable with said quick connect pressure coupling-check valve assemblies, and each having a threaded fitting at the other end threadably engageable with an engine spark plug opening;

an inlet fitting installed in said inlet port enabling connection to a quick connect coupling for pressurizing said internal passages, whereby any number of said pressure hoses may be installed in respective spark plug openings to enable simultaneous pressurization of any number of engine cylinders, up to the total number of outlet ports.

2. The fixturing according to claim 1 wherein said manifold body is cylindrically shaped, and each of said inlet and outlet ports are disposed about the periphery of said cylindrical manifold body so that each of the quick connect pressure coupling-check valve assemblies extend outwardly from said periphery of said manifold body at an angle to each other.

3. The fixturing according to claim 2 wherein each of said outlet ports are arrayed about one half of the periphery of said manifold body.

4. The fixturing according to claim 1 wherein said manifold body is formed with four outlet ports, whereby said fixturing may be employed to pressurize the cylinders of one bank of either a V-6 or V-8 engine.

5. The fixturing according to claim 1 wherein each of said threaded fittings mounted on said pressure hoses includes a stepped diameter end, with different diameter threads formed on each step, matable with different diameter spark plug openings to thereby enable use of said fixturing with differing diameter spark plug openings.

6. A process of simultaneously pressurizing differing numbers of the cylinders of a multi-cylinder internal combustion engine for servicing thereof, comprising the steps of:

simultaneously pressurizing a number of outlet ports of a manifold body while controlling opening of said ports with check valving associated with each of said outlet ports;

installing a corresponding number of pressure hoses to said number of cylinders by threadably mating one end of a respective one of said hoses with a spark plug opening;

coupling the other end of each of said hoses with a respective one of said outlet ports so as to open said check valving and pressurize said associated cylinder.

7. The process according to claim 6 wherein four outlet ports are pressurized to enable simultaneous pressurizing of from one to four engine cylinders.

8. The process according to claim 6 applied to a vee engine wherein all of the cylinders of one bank of said vee engine are simultaneously pressurized to pressure balance the force of said pressure on the pistons of said pressurized cylinders.

9. A process of detecting leaks from a combustion chamber of a multicylinder internal combustion piston engine of the type having a plurality of combustion chambers, a plurality of spark plug openings, each entering into a respective one of said plurality of combustion chambers, comprising the steps of:

pressurizing all of said combustion chambers simultaneously through each respective spark plug opening with a fluid under pressure; and, successively depressurizing each of said combustion chambers while detecting any flow of said fluid out from any of said combustion chambers to thereby identify any leaks from one of said combustion chambers by cessation of outflow upon depressurization of said leaking combustion chamber.

10. The process according to claim 9 wherein said fluid used in said pressurizing step is a gas and wherein said step of detecting outflow comprises the step of observing bubbles in coolant.

11. The process according to claim 9 wherein said engine is of the type including intake valves and a carburetor, and wherein said step of detecting outflow of fluid comprises the step of detecting flow at said carburetor.

12. The process according to claim 9 including exhaust valves and an exhaust pipe system and wherein said detecting step includes the step of detecting outflow of fluid from said exhaust pipe system.

* * * * *